(12) United States Patent
Zuczek

(10) Patent No.: US 9,619,908 B1
(45) Date of Patent: Apr. 11, 2017

(54) IDENTIFICATION OF LINES IN A HEAT MAP

(71) Applicant: Google Inc., Mountain View, CA (US)

(72) Inventor: Pawel Zuczek, Adliswil (CH)

(73) Assignee: Google Inc., Mountain View, CA (US)

( * ) Notice: Subject to any disclaimer, the term of this patent is extended or adjusted under 35 U.S.C. 154(b) by 423 days.

(21) Appl. No.: 14/223,640

(22) Filed: Mar. 24, 2014

(51) Int. Cl.
*G06F 17/30* (2006.01)
*G06T 11/20* (2006.01)

(52) U.S. Cl.
CPC .................................. *G06T 11/206* (2013.01)

(58) Field of Classification Search
CPC .............................................. G06F 17/30289
See application file for complete search history.

(56) References Cited

U.S. PATENT DOCUMENTS

| 2012/0044265 A1* | 2/2012 | Khorashadi | G01C 21/206 345/641 |
| 2016/0021333 A1* | 1/2016 | Lim | H04N 5/765 386/248 |

OTHER PUBLICATIONS

Weiyao Lin, Hang Chu, Jianxin Wu, Bin Sheng, and Zhenzhong Chen, "A Heat-Map Based Algorithm for Recognizing Group Activities in Videos", IEEE Transactions on Circuits and Systems for Video Technology, 2013, vol. 23, Issue: 11, pp. 1980-1992.*
Pieter Blignaut, "Visual Span and Other Parameters for the Generation of Heatmaps", Department of Computer Science and Informatics, University of the Free State, South Africa, ETRA '10 Proceedings of the 2010 Symposium on Eye-Tracking Research & Applications, pp. 125-128.*

* cited by examiner

*Primary Examiner* — Cheryl Lewis
(74) *Attorney, Agent, or Firm* — Fenwick & West LLP

(57) ABSTRACT

Systems and methods are provided for identifying lines in a heat map representative of overlap between two data sets. In an aspect, a method includes generating a heat map comprising a plurality of data points that represent similarities between a first data set and a second data set. The method further includes identifying areas of the heat map within a region of the heat map comprising a potential match line, identifying short lines formed via subsets of the data points respectively contained within the areas, merging the short lines to form a long line, determining degrees of continuity along the long line, and identifying a portion of the long line associated with a degree of continuity above a continuity threshold.

17 Claims, 11 Drawing Sheets

IDENTIFICATION OF LINES IN A HEAT MAP

TECHNICAL FIELD

This application generally relates to systems and methods for identifying lines in a heat map representative of overlap between two data sets.

BACKGROUND

A heat map is an abstract representation of correspondence between two data sets. Heat maps are often employed to compare and analyze categorical data. For example, the cluster heat map is a display of a data matrix that reveals row and column hierarchical cluster structure in the data matrix. It consists of a rectangular tiling with each tile shaded on a color scale to represent the value of the corresponding element of the data matrix. Within a relatively compact display area, it facilitates inspection of row, column and joint cluster structure. The cluster heat map compacts large amounts of information (e.g., several thousand rows/columns) into a small space to bring out coherent patterns in the data.

Identification of patterns formed via variations and clusters of data points in a heat map (e.g., often rendered as pixels of a digital image representation of the heat map) can reveal various correlations between data sets. Several techniques have evolved to facilitate identification of such patterns. The patterns formed in a heat mat and the techniques for identifying such patterns are dependent on the type of data represented by the matrices and the manner in which the data is organized, filtered and arranged. One popular mechanism for evaluating heat maps uses a seriation loss function that involves analysis of the sum of distances between adjacent rows and columns. Another mechanism involves sampling of values from known bivariate distributions, randomizing rows and columns in the sampled data matrix and comparison of solutions from different seriation algorithms. Other forms of analysis involve identification of various patterns where rows and column covariances are determined by different covariance structures, including toeplitz, band, circular, equicovariance, and block diagonal lines.

Various techniques have evolved to facilitate automated heat map analysis and pattern identification. However, many of these techniques are insufficient. This problem is exacerbated with heat map based on data involving one dimension of input and two dimensions of output. Such heat maps are generally associated with a lot of redundancy which causes many potential patterns to appear as noise or exhibit low complexity. As a result, many automated techniques produce false positive (e.g., identification of patterns that are non-representative of an accurate data correlation) and false negative (e.g., failure to identify patterns that are representative of a data correlation). Accordingly a more sensitive and granular approach to automatically identify patterns and correlations in heat maps is needed.

BRIEF DESCRIPTION OF THE DRAWINGS

Numerous aspects, embodiments, objects and advantages of the present heat map analysis techniques will be apparent upon consideration of the following detailed description, taken in conjunction with the accompanying drawings, in which like reference characters refer to like parts throughout, and in which.

DETAILED DESCRIPTION

Figure 1:
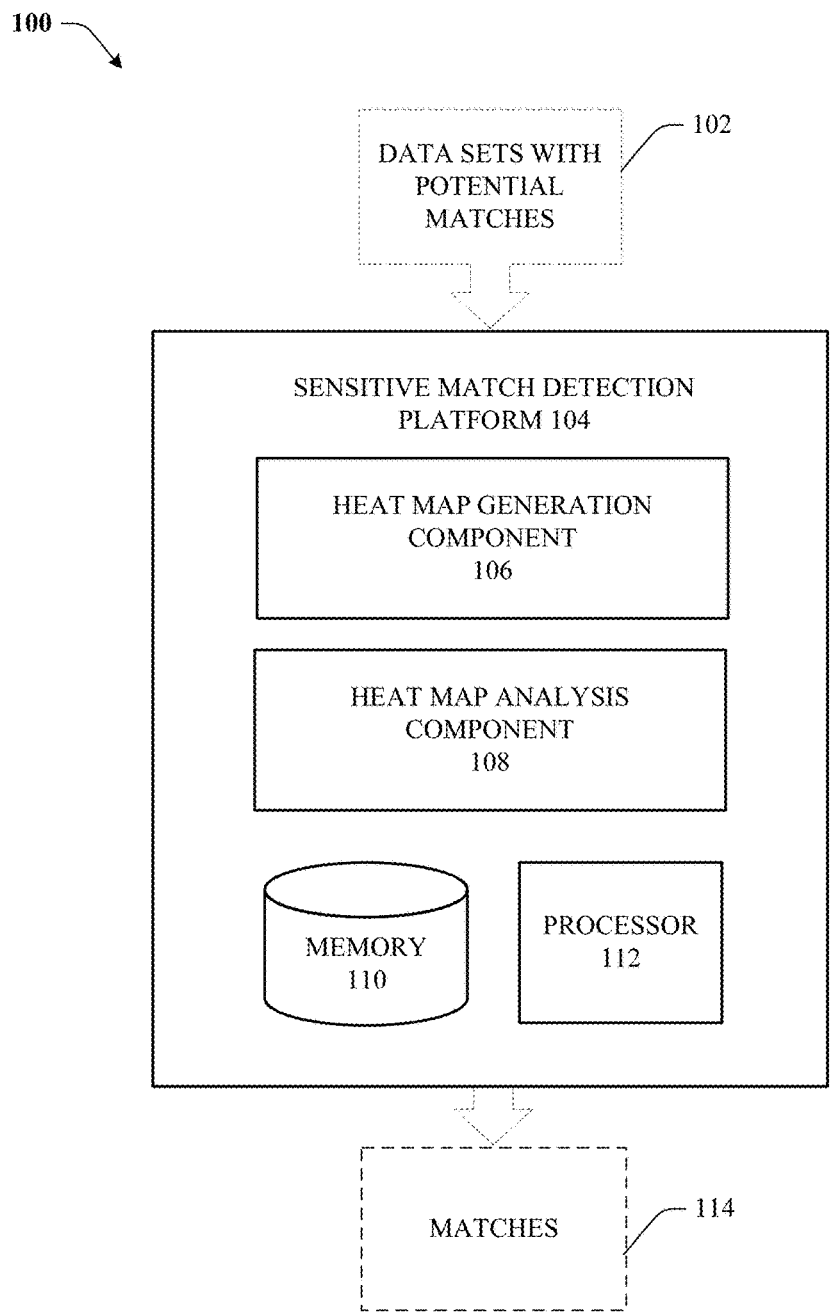
FIG. 1 illustrates an example system for identifying lines in a heat map representative of overlap between two data sets in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for identifying lines in a heat map representative of similarities between two data sets. In particular, the disclosed subject matter relates to generation and analysis of heat maps that compare similarities between two data sets, such as data sets representative of two images, two songs, two videos, two documents, two deoxyribonucleic acid (DNA) samples, etc. Techniques are provided for automated analysis of the heat maps to identify overlapping portions or matches between one or more aspects of the content represented by the respective data sets. The overlapping portions or matches of content between the respective data sets are represented by linear or substantially linear clusters of data points that can often be distinguished as diagonal lines formed at or near a 45° angle relative to the axis of the heat map. These lines are referred to herein as match lines.

In an aspect, a heat map is generated that represents associations between two data sets. For example, information representative of similarities between respective parts of two content items can be mapped in a data matrix wherein one axis represents different parts of a first content item and a second axis represents different parts of the other content item. The data entry at each coordinate or cell of the matrix can include a value representative of the degree of similarity between respective parts of the two content items represented by the coordinates. The information representative of the similarity between two parts of a content item can vary. In an aspect, a distance metric (e.g., a Hamming or Jaccard distance) can be employed to represent a degree of similarity between the respective parts. However, other mechanisms for calculating values representative of a degree of similarity between two objects can be employed.

A heat map representative of the data matrix is clustered or organized in such a manner wherein patterns indicative of correlations between the data sets are represented by clusters of data points associated with same or similar high values that form, or substantially form, diagonal lines having an angle at or near 45° relative to the axes of the heat map/data matrix (e.g., match lines). For example, these diagonal lines can be visualized via a digital image representation of the heat map wherein linear clusters of data points (e.g., rendered as pixels of the digital image) having a same or similar color or color shade form distinguishable diagonal lines. The values represented by data points of the heat map are respectively associated with heat values. The heat value of a data point corresponds to the degree of similarity between the respective parts of the two data sets being compared at the data point. In an aspect, data points representative of a high degree of similarity are associated with high heat values and data points associated with a low degree of similarity are associated with low heat. When a heat map is visualized as a digital image, data points/pixels can vary in color or color shade based on the degree of similarity they represent as a function of color or color shade assigned to the respective heat values. For example, heat values representative of a high degree of similarity can be associated with a darker color and heat values representative of low degree of similarity can be associated with a lighter color.

Automated analysis of the heat map to identify matches between data included in the two data sets being compared via the heat map involves a series of determinations that filter data points of the heat map to identify subsets of aligned or substantially aligned data points formed at an angle relative to the axes of the heat map, and that exhibit high continuity, strength, and complexity. A subset of aligned or substantially aligned data points that pass a series of scrutiny filters as described herein is considered (to a relatively high confidence level) representative of overlap between data included in the two data sets for which the heat map is based and declared as match lines. Initially, analysis of the heat map involves identification of regions of the heat map that potentially contain match lines. These regions, referred to herein as regions of interest. These regions of interest are then divided into a plurality of sub-regions referred to herein as areas of interest. The regions and areas of interest have defined dimensions that broadly cover potential heat lines. In an aspect, a region of interest is shaped as a large rectangle and the areas of interest within the large rectangle include a plurality of smaller rectangles. After areas of interest are identified, they are analyzed to identify short lines included therein using a line finding technique (e.g., Hough transform). For each area of interest, a single short line is either identified or not. Regions and areas of interest can overlap so that short lines that go through edges of the regions and areas can be identified.

After short lines are identified, they are analyzed to determine their respective strengths as match candidates. In an aspect, the strength of a short line is a function of intensity of the short line relative to background intensity, density of the short line relative to background density and complexity of an area around the short line. The short lines are then filtered based on their respective strengths and short lines that are not strong enough with respect to a threshold strength requirement are discarded. The remaining short lines associated with respective regions of interest are then merged together to form a long line. Continuity of a long line is then evaluated and a portion (or portions) of the long line characterized as having a continuity above a continuity threshold is identified as a match line. The data points that form the portion of the long line considered a match line are identified and determined to be representative of same or similar data between the two data sets.

The subject heat map analysis techniques can be employed to identify overlap between various types of data sets. In an exemplary embodiment, the subject techniques are employed to facilitate identification of same or similar content included in two media items, such as two videos or two songs. For example, an uploaded video can be screened against a reference index that identifies reference video and/or audio content to determine if the uploaded video includes any of the reference content (e.g., even if the new video is highly transformed, noisy, etc.). In an aspect, using the reference index, video (and/or audio) content identified in the index that potentially matches content of a scrutinized video are determined. A heat map of similarity between the scrutinized video and potentially matching indexed content can be created and evaluated using the techniques disclosed herein to identify portions of the scrutinized video and the indexed content that in fact are the same or substantially similar.

In one or more aspects, a method is disclosed that includes using a processor to execute the following computer executable instructions stored in a memory to perform various acts. These acts include generating a heat map comprising a plurality of data points that represent similarities between a first data set and a second data set. The method further includes identifying areas of the heat map within a region of the heat map comprising a potential match line, identifying short lines formed via subsets of the data points respectively contained within the areas, merging the short lines to form a long line, determining degrees of continuity along the long line, and identifying a portion of the long line associated with a degree of continuity above a continuity threshold.

In another aspect, a system is disclosed that includes a heat map component configured to generate a heat map comprising a plurality of data points representative of similarities between a first data set and a second data set. The system further includes an analysis component configured to identify a match line formed via a subset of the data points representative of matches between data included in the first and second data sets, wherein the analysis component identifies short lines respectively formed via data points within areas of the heat map associated with a region of the heat map comprising a potential match line, merges the short lines to form a long line, and identifies the match line based on a degree of continuity along the long line.

Further provided is a tangible computer-readable storage medium comprising computer-readable instructions that, in response to execution, cause a computing system to perform various operations. These operations include generating a heat map comprising a plurality of data points that represent similarities between a first data set and a second data set, identifying areas of the heat map within a region of the heat map comprising a potential match line, identifying short lines formed via subsets of the data points respectively contained within the areas, merging the short lines to a form long line, and identifying data points representative of same or similar data between the first and second data sets based on a degree of continuity of a portion of the long line comprising the data points.

Turning now to FIG. 1, illustrated is an example system 100 for identifying lines in a heat map representative of similarities between two data sets in accordance with various aspects described in this disclosure. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described. Generally, system 100 can include memory 110 that stores computer executable components and processor 112 that executes computer executable components stored in the memory, examples of which can be found with reference to FIG. 10.

System 100 includes sensitive match detection platform 104. Sensitive match detection platform 104 is configured to process input that includes data sets 102 with potential matches (e.g., same or substantially similar data) and output actual matches 114 (if any are determined) between the data sets. Sensitive match detection platform 104 includes heat map generation component 106 and heat map analysis component 108. Heat map generation component 106 is configured to generate a heat map representative of similarities between two received data sets 102 that potentially include matches. Heat map analysis component 108 is configured to process and analyze the heat map to identify match lines formed in the heat map that are representatives of same or substantially similar data included in the respective data sets. In response to identification of a match line, heat map analysis component 108 can identify the specific data points that form the match line and extract the data included in the respective data sets associated with the respective data points.

Aspects of system 100, (and additional systems described herein) are exemplified herein in association with processing of data sets representative of two media items, or portions of the two media items, to identify same or substantially similar media content included in the respective media items. However, it should be appreciated that the systems and methods disclosed herein can be employed to identify match lines in heat maps representative of similarities between various types of data sets. As used herein the term media content or media item can include but is not limited to a video, a video clip or segment, an animation, an audio file (e.g., music, songs, sounds, dialogue, etc.), or an image. In some aspects, the term media content or media item includes a collection of media items such as a playlist including several videos or songs or a channel including several videos or songs associated with a single media creator.

In an aspect, sensitive match detection platform 104 can receive two data sets representative of two different media items or portions of the two different media items. One of the media items can include a scrutinized media item that has been detected to potentially include same or similar media content as a reference media content. The other media item can include the reference media content. According to this example, data sets 102 with potential matches can be detected by an early content matching system that provides a cursory comparison between the scrutinized media item and a reference index that includes thousands to millions (and potentially innumerable) of data files representing reference media content. Sensitive match detection platform 104 can then provide a more detailed analysis between the data sets 102 detected to include matches and provide a highly accurate determination as to whether the two data sets actually include matches and what portions of the data sets match (e.g., even if the scrutinized media item is highly transformed).

In an aspect, data sets 102 representative of two media items that potentially include matching content can include feature vectors representative of respective features associated with the two media items. For example, where the data sets 102 represent image data associated with two videos or two video segments, the feature vectors can include image features such as pixel values for images of the respective videos/video segments. In another example, the feature vectors can include wavelets or other features (including, for example, local features) associated with the images of the respective videos/video segments. In yet another example, the feature vectors can represent unique fingerprints respectively associated with images and/or audio of the respective videos/video segments. In the case where the data sets 102 relate to two audio samples, the feature vectors can include wavelet values (or other features associated with audio) for the wavelets of the respective audio samples, audio fingerprints for the respective audio samples, encoded hashes for the respective audio samples, a spectrogram, etc.

In response to receipt of data sets 102 that potentially include matching content, heat map generation component 106 is configured to generate a heat map representative of similarities between the two data sets. For example, where the data sets 102 are representative of two videos or (portions of two videos); heat map generation component 106 can generate a heat map of similarity between them. In order to compare and identify matching content between the two videos, heat map generation component 106 computes the similarity of each point in time in one video to each point in time in the other video. For example, the data sets 102 can include feature vectors (e.g., video fingerprints) associated with each point in time in one video and each point in time in the other video. According to this example, heat map generation component 106 can employ a distance metric (e.g., a Hamming or Jaccard distance metric) to determine distance values representative of the degree of similarity between respective feature vectors associated with each point in time in one video and each point in time in the other video.

Figure 2:
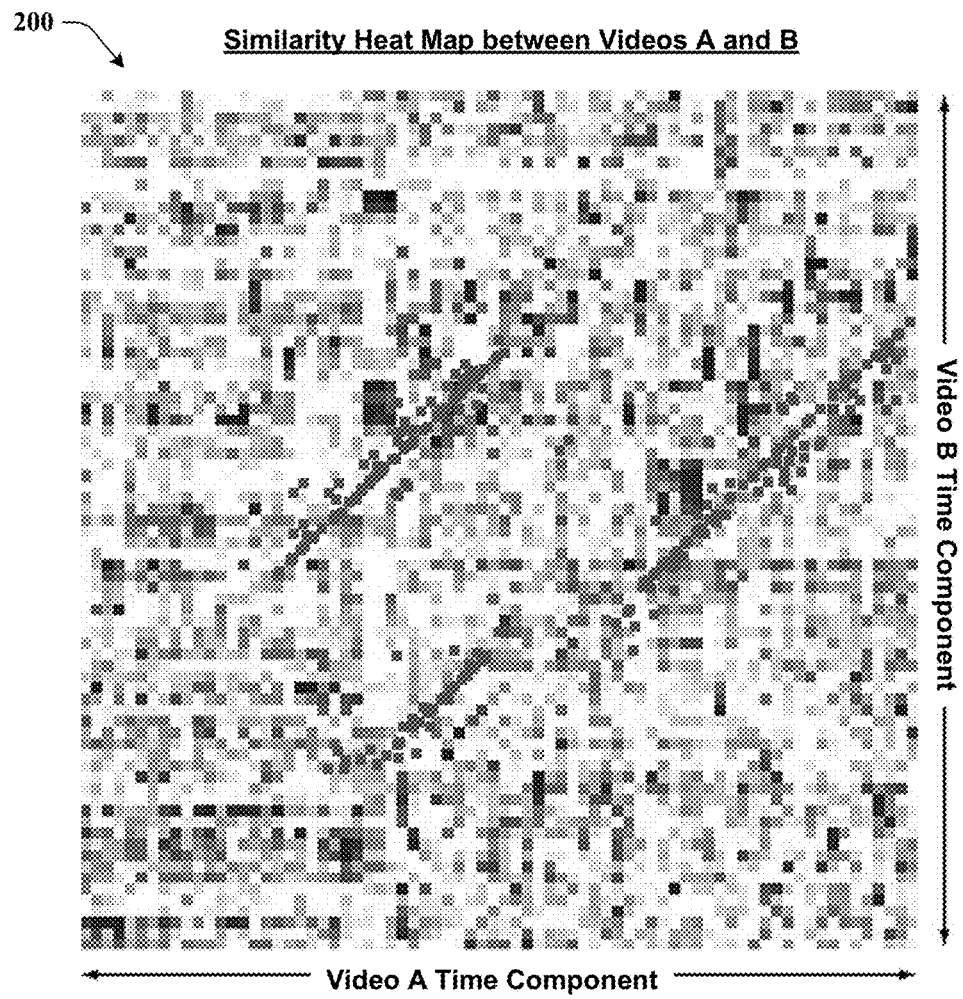
FIG. 2 illustrates an example heat map and associated data matrix representative of overlap between two data sets in accordance with various aspects and embodiments described herein.

For example, FIG. 2 illustrates an example heat map 200 generated by heat map generation component 106 that represents similarities between two videos in accordance with aspects and embodiments described herein. For example, heat map 200 can mark Hamming or Jaccard distances between video fingerprints for videos A and B. Heat map 200 is displayed as graphical image wherein each point or pixel of the image corresponds to individual values in a data matrix that compares similarity values for the two videos. For example, heat map 200 can correspond to data matrix 201, wherein each point or pixel in the heat map corresponds to a value at a coordinate (e.g., an (x, y) coordinate) of data matrix 201.

In data matrix 201, (and similarly heat map 200), one axis represents respective points in time for a first video, video A, and the other axis represents respective points in time for a second video, Video B. For example, T1-TN (where N is an integer) represent respective points in time of a first video A, and T1'-TN' are respective points in time of a second video B. The points in time can mark individual video frames, groups of video frames, segment of video between two time markers, etc. In an aspect, the points in time along each axis represent sequential points in time of the respective videos. For example, T1-TN can represent frames 20-90 in video A and T1'-TN' can represent frames 810-980 in video B. However, in other aspects, the points in time along each axis can represent non-sequential points in time of the respective videos. In addition, data matrix 201 can be clustered, filtered, etc., in various manners to rearrange the order of the respective rows and columns.

In data matrix 201, each cell includes a value dx (where x is a number) that represents a degree of similarity between video A and Video B at each point in time of Video A relative to each point in time of Video B. In an aspect, dx represents a calculated distance value (e.g., a Hamming or Jaccard distance value) between video fingerprints of Video A and Video B at each point in time relative to one another. For example, dx at cell (T1,T1') can be a function of a Hamming or Jaccard distance between a fingerprint for Video A at time T1 and a fingerprint for video B at time T1', dx at cell (T2,T2') can be a function of a Hamming or Jaccard distance between a fingerprint for Video A at time T2 and a fingerprint for video B at time T2', etc.

Each point or pixel in heat map 200 corresponds to a similarity value dx at a coordinate of data matrix 201. The color or degree of shading of each pixel or point can reflect the dx value it represents. For example, heat map 200 can employ a color shading scheme wherein the darker the pixel/point, the higher the degree of similarity between two fingerprints (e.g., represented by a low dx value) and the lighter the pixel/point, the lower the degree of similarity between two fingerprints (e.g., represented by a high dx value). As used herein, the term "high heat" is used to describe areas or points of a heat map (e.g., heat map 200) associated with dx values representative of a high degrees of similarity between content of two compared data sets and the term "low heat" is used to describe areas or points of a heat map associated with dx values representative of a low degree of similarity between content of two compared data sets.

Heat maps formed by heat map generation component 106 (e.g., heat map 200) can be analyzed to identify diagonal match lines occurring therein. These lines occur in places where two compared data sets include the same or substantially similar material. For example, diagonal match lines present in heat map 200 indicate what parts of videos A and B share the same video material. Analysis of heat maps (e.g., heat map 200) to automatically identify such diagonal match lines is described in greater detail with reference to FIGS. 3-6.

Figure 3:
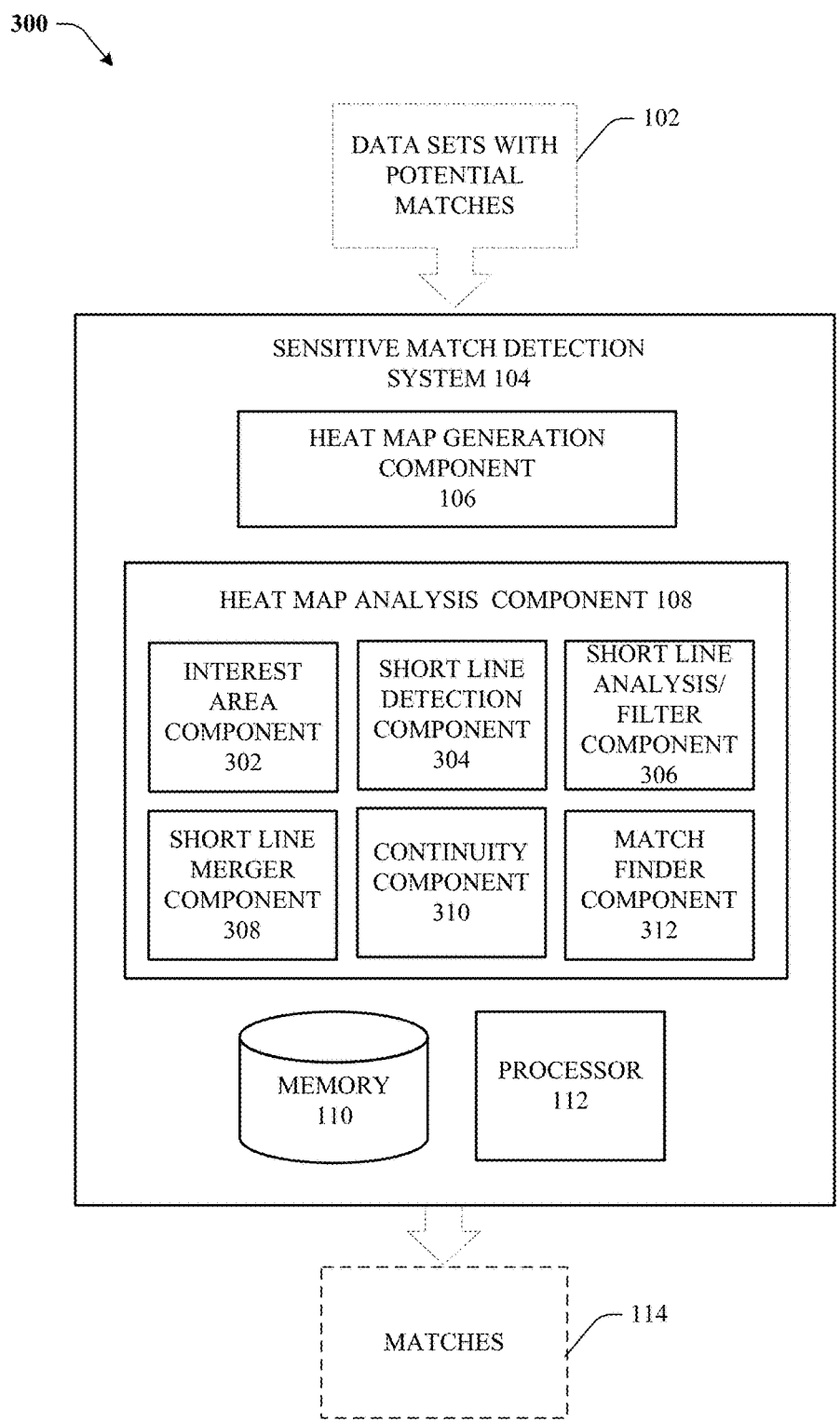
FIG. 3 illustrates another example system for identifying lines in a heat map representative of overlap between two data sets in accordance with various aspects and embodiments described herein.

FIG. 3 presents another example system 300 for identifying lines in a heat map representative of similarities between two data sets in accordance with various aspects and embodiments described in this disclosure. System 300 can include same or similar functionalities as system 100 with the addition of various components to heat map analysis component 108, including interest area component 302, short line detection component 304, short line analysis/filter component 306, short line merger component 308, continuity component 310, and match finder component 312. Repetitive description of like elements employed in respective embodiments of systems, methods and heat maps described herein is omitted for sake of brevity.

Aspects of the various components of heat map analysis component 108 are described in accordance with analysis of a heat map (e.g., heat map 200) generated by heat map generation component 106. As previously described, a heat map generated by heat map generation component 106 includes a plurality of data points (or pixels) representative of degrees of similarities between first and second sets (e.g., fingerprints for a first video and fingerprints for a second video). Each point or pixel in the heat map indicates a degree of similarity between a subset of data from the first data set (e.g., a fingerprint from a first video at a specific point in time in the first video) and a subset of data from the second data (e.g., a fingerprint of a second video at a specific point in time in the second video). Respective axes (e.g., X and Y axes) of the two dimensional heat map correspond to a plurality of subsets or parts of the data sets being compared with one another. For example, with respect to heat map 200, the X axis corresponds to sequential points in time T1-TN in video A and the Y axis corresponds to sequential points in time T1'-TN' in video B. Portions of the first data set that are the same or substantially similar to portions of the second data set are represented by one or more diagonal or substantially diagonal lines present in the heat map. The diagonal lines are formed by aligned (or substantially aligned) data points/pixels having same or relatively similar high heat values. The various component of heat map analysis component 108 facilitate automated detection of these lines.

Interest area component 302 is configured to identify areas of the heat map that potentially include clusters of data points that form or substantially form diagonal lines (e.g., at or near a 45° angle with respect to the axes of the heat map) representative of matches between data respectively included in the data sets being compared via the heat map. These areas, referred to herein as areas of interest. As used herein, the term match line is used to refer to a cluster of data points that form or substantially form a diagonal line with respect to the axes of the heat map that is representative of a match between data included in the respective data sets being compared via the heat map. Although the tem "line" is employed, match lines can include clusters of data points that are not straight lines and that are not positioned at a 45° angle.

Figure 4:
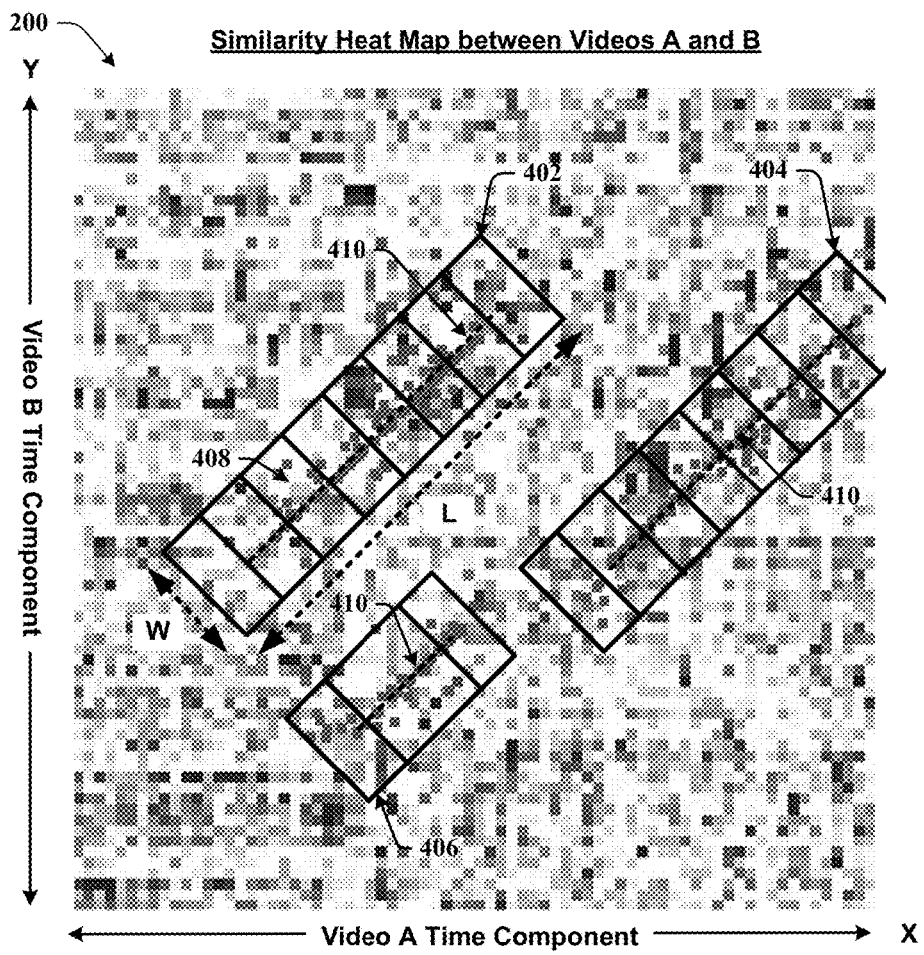
FIG. 4 illustrates an example heat map with marked regions and areas of interest in accordance with various aspects and embodiments described herein.

In an aspect, interest area component 302 first identifies a broad region of interest that potentially includes match lines and then identifies smaller areas of interest within the region of interest. For example, FIG. 4 illustrates heat map 200 with example regions of interest and areas of interest marked, as identified by interest area component 302. Larger rectangles 402, 404 and 406 mark three different regions of interest and the smaller rectangles formed within the larger rectangles (e.g., small rectangle 408 and the like) mark areas of interest.

In an aspect, interest area component 302 identifies regions of interest based on a received rough indication of potential match line candidates in the heat map. For example, with respect to FIG. 4, the dashed lines 410 formed along the center of the regions of interest 402, 404 and 406, respectively, can indicate potential match line candidates. According to this aspect, interest area component 302 can receive a rough estimate where match lines potentially occur in the heat map and/or determine a rough estimate where match lines potentially occur in the heat map (e.g., using various line finding techniques such as Hough transform and the like). This rough estimate can identify potential match line candidates in the heat map based on clusters of data points having same or similar heat values that form angled lines with respect to the two axes of the heat map (e.g., where the X and Y axes intersect at a 90° angle). Interest area component 302 can determine a region of interest around these potential match line candidates by indentifying a broad region surrounding the potential match line candidates, wherein the potential match line candidates are provided in the center of the broad region.

For example, interest area component 302 can identify a large rectangular region around a potential match line candidate, wherein a width (W) of the rectangle is perpendicular to the potential match line and a length (L) of the rectangle is parallel to the potential match line at an angle relative to the axes of the heat map. The angle of the rectangular region of interest can vary. In an aspect, the rectangle is at or near a 45° angle relative to the axes of the heat map. This is to be expected where data between the data sets represented by a match line included in the region of interest is identical or nearly identical (e.g., a video segment in a first video is identical or nearly identical to a video segment of another video). However in various aspects, the angle of the rectangle can vary with respect to the axes of the heat map such that the angle of the rectangle is between about 10° and about 80° relative to the axes of the heat map (e.g., at least not vertical or horizontal). This is to be expected where data between the data sets represented by a match line included in the region of interest is similar but not identical (e.g., a video segment in a first video is similar to a video segment in another video yet the segments differ with respect to encoding parameters).

In an aspect, interest area component 302 can determine the dimensions of the rectangular region of interest as a function of the length of the potential heat line and the complexity of the area surrounding the potential line. In another aspect, area interest component 302 can apply prefixed threshold values that control the dimensions of a region of interest around a potential match line. For example, a threshold value can set or restrict the distance a region of interest spans around a potential match line (e.g., the radius of a rectangular region of interest).

The term complexity refer to a degree to which a similarity value represented by a data point is based on input data having a degree of complexity that distinguishes it from other input data and/or constitutes valid input data. For example, when a similarity value is calculated for a matrix cell/data point based on two data values having low complexity, a high degree of high degree of similarity can be determined for the two data values despite actual correspondence between the two data values. This is often seen where two video fingerprints are compared where the fingerprints contain little information (e.g., the points in videos from which the fingerprints were sampled is static). These low complexity fingerprints are often calculated to have high degrees of similarity. However this calculation of similarity is a weak indication of matching content. Accordingly, data points represented by input values exhibiting high complexity and having high similarity values are preferred. With respect to the heat map visualization, data points associated with low complexity usually create high match areas on the heat map having a cluster pattern in the form of a patch or rectangle as opposed to a distinguishable line.

In an aspect, interest area component 302 further analyzes a region of interest to determine a plurality of smaller areas of interest within (and/or near) a region of interest. In other aspect, interest area component 302 can consider the entire heat map a region of interest and proceed to identify smaller areas of interest within the heat map based on clusters of data points having same or similar relatively high heat values (e.g., heat values averaging above a threshold heat value).

In an aspect, interest area component 302 divides a region of interest into a plurality of smaller areas or interest based on the dimensions of the region of interest and a predetermined relationship between dimensions of areas of interest, dimensions of a region of interest, and number of areas of interest (e.g., an area is 1/X an area or dimension of the region of interest, where X is a variable). In another aspect, interest area component 302 can apply predetermined requirements regarding the dimensions of an area of interest within a region of interest and the number of areas of interest within a region of interest (e.g., an area of interest can have a shape of S with an area A, where S is a defined shape and A is a defined area of the shape). In another aspect, interest area component 302 can identify an area of interest can based on inclusion of a predefined number, range, or percentage data points or pixels included therein (e.g., area of interest can include P number of pixels/points, where P is a number).

For example, interest area component 302 can apply a requirement wherein areas of interest have rectangular dimensions $W_A \times L_B$ and the number of interest areas is Y or less and odd, (wherein A, B and Y are variable numbers). In another example, interest area component 302 can require areas of interest have a rectangular shape with a width that corresponds to the width of the rectangular region of interest. For example, with reference to FIG. 4, it can be seen that each of the areas of interest 408 have widths (W) corresponding to the widths of the rectangular regions of interest (e.g., regions 402, 404, and 406). According to this example, the areas of interest will have a length (L) that also spans at an angle with respect to the axes of the heat map). Interest area component 302 can also require areas of interest have a length (L) 1/X the length (L) of the region of interest.

In an aspect, interest area component 302 defines overlapping areas of interest. For example, interest area component 302 can identify a plurality of rectangular areas of interest within a region of interest, wherein some or all of the areas of interest have overlapping areas. According to this aspect, by defining overlapping areas on interest, short lines (describe infra with respect to short line detection component 304) that go through the edges or the area of a single area of interest, can be detected.

With reference again to FIG. 3, short line detection component 304 is configured to identify short lines formed via a subset of data points/pixels respectively contained within each of the areas of interest. In particular, short line detection component 304 is configured process each of the areas of interest by identifying each of the data points/pixels included in an area of interest (e.g., coordinates of those data points relative to the area of interest and/or the entire heat map) and applying a line finding technique to identify short lines included in the area of interest. For example, short line detection component 304 can employ a Hough transform, (or other line identification technique) with respect to each of the data points/pixels included in an area of interest to identify short lines formed in the area of interest by different subsets of aligned data points/pixels. Again, although the term "line" is employed with regards to a short line, it is to be appreciated that the data points forming a short line do not have to align in a perfectly straight manner.

Short line detection component 304 then analyzes the short lines formed within an area of interest and selects a single one of the short lines to represent the area of interest. Short line detection component 304 is particularly looking for a short line that is formed at an angle relative to the axes of the heat map and that has pixels/points associated with relatively high heat values with respect to pixels/points around the short line. Accordingly, in an aspect, short line detection component 304 can filter a plurality of potential short lines identified within an area of interest to select a single one of the short lines based on respective angles of the short lines and respective approximate strengths of the short lines, wherein short lines that are substantially horizontal or substantially vertical are discarded. Short line detection component 304 can determine an approximate strength of a short line based on a degree to which heat values associated with points/pixels of the short line contrast with heat values of data points/pixels around the short line. In an aspect, short line detection component 304 can select one of the short lines based on strength of the short line relative to strengths of other short lines and an angular position of the short line relative to the axes of the heat map.

For example, short line detection component 304 can discard short lines that are positioned at angles too flat (e.g., between about 30° to 0°) or too steep (e.g., between about 60° to about 90°) with respect to an optimal angle of 45° angle relative to the axes of the heat map, especially short lines that are substantially vertical or horizontal. In addition, for each identified short line within an area of interest, short line detection component 304 can determine the short line's ratio of strength (as a function of heat values for the data points/pixels forming the short line) to the peak strength of pixels/points around the line (e.g., within the area of interest and/or outside the area of interest). Short line detection component 304 can discard those short lines that are not strong enough (e.g., based on this approximate determination of strength) in comparison to the environment that surrounds them.

Figure 5:
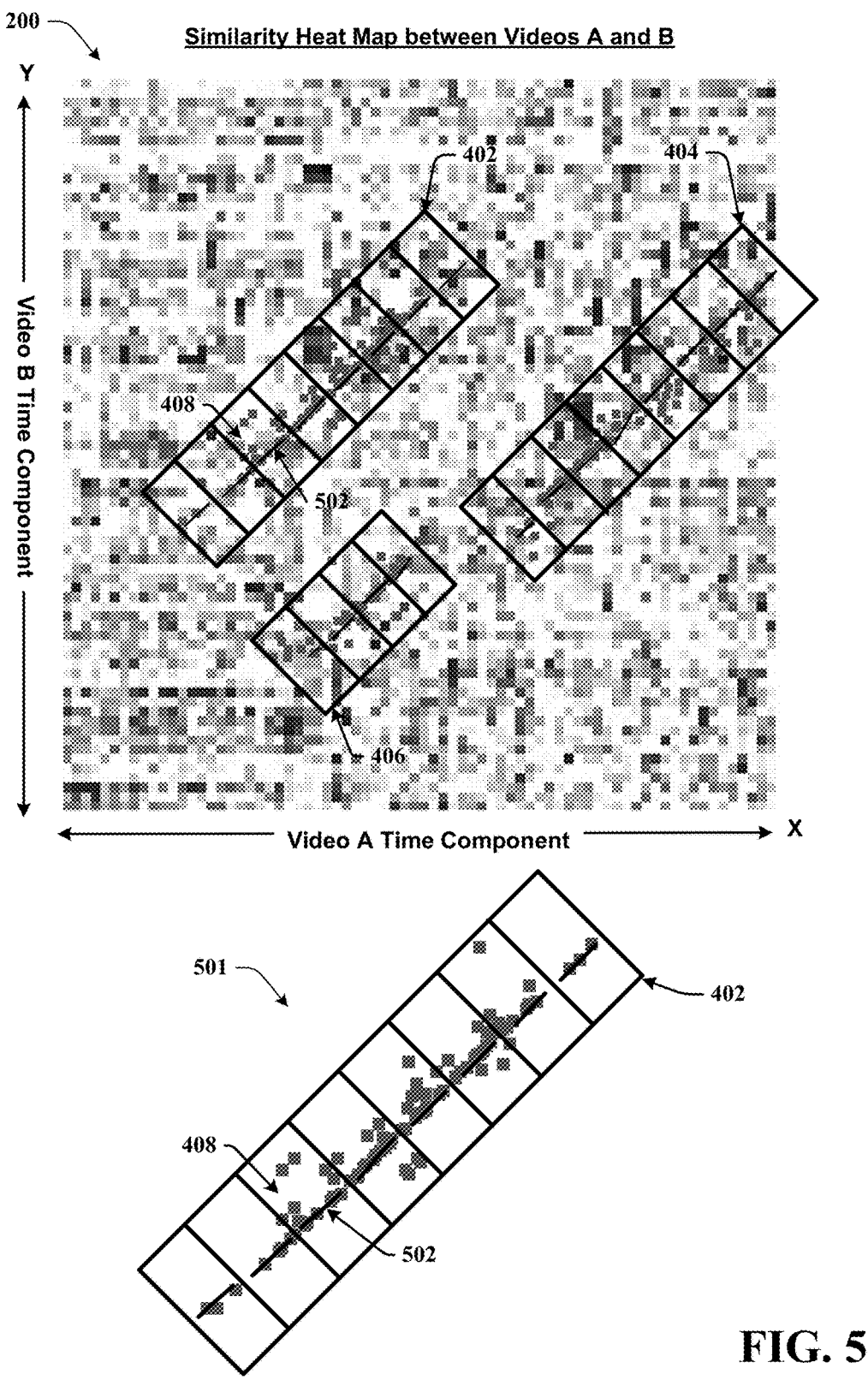
FIG. 5 illustrates an example heat map with marked short lines in accordance with various aspects and embodiments described herein.

For example, FIG. 5 illustrates heat map 200 with example short lines 502 (and the like) drawn in respective areas of interest 408 (and the like). Diagram 501 presents an enlarged view of region 402 for ease of demonstration. As seen in FIG. 5, each area of interest 408 includes one short line 502 formed at an angle (e.g., substantially 45° angle) with respect to the axes of the heat map. It should be appreciated that FIG. 5 depicts a simplified view of potential areas of interest and short lines formed therein. In particular, a region of interest (e.g., regions 402, 404 and 406) can have a plurality of partially overlapping areas of interest, each including short lines that can overlap with other short lines.

In an aspect, short line detection component 304 can apply minimum threshold requirements for the angle and strength of a short line identified within an area of interest. Those short lines that do not pass this minimum threshold can be discarded. Thus it is to be appreciated that short line detection component 304 can return a result of "no short line detected" for some areas of interest (e.g., some areas of interest will not include an adequate short line and will thus be disregarded).

Referring back to FIG. 3, short line analysis/filter component 306 is configured to further analyze and/or filter short lines detected by short line detection component 304 with respect to their strength and complexity. In particular, short line analysis/filter component 306 is configured to analyze a short line identified by short line detection component 304 and/or selected by short line detection component 304 to represent an area of interest, and determine a more precise valuation of strength and complexity of the short line.

In an aspect, in order to determine a precise strength and complexity of a short line, short line analysis/filter component 306 is configured to analyze each point/pixel that forms the short line with respect to intensity of the data point relative to background intensity, density of the data point relative to background density, and/or complexity of an area around the data point. This is done by comparing each point/pixel on the short line with points/pixels within a predefined distance around the short line.

Intensity of a data point on a short line refers to contrast between a heat value of the data point with respect to average heat values of data points within proximate vicinity of the data point (wherein proximate vicinity can be a predefined radial distance). According to this aspect, short line analysis/filter component 306 can associate an intensity value with the data point/pixel based on the difference between the heat value of the data point and the average heat values represented by the data points within the proximate vicinity of the data point. The greater the difference between the heat value of the data point and the average heat values of the data points around the data point, the higher the intensity value associated with the data point will be. Data points/pixels associated with high intensity are preferred.

Density refers to the relationship between a data point/pixel on the short line with respect to other data points/pixels around the short line near the data point/pixel. In particular, a data point/pixel on the short line is associated with a high density value where the data point has a high heat value and other data points/pixels adjacent to and near the data point around the short line are also associated with high heat values. In other words, short line analysis/filter component 306 associates higher density values with data points/pixels having high heat values that are clustered together or occur frequently on and around the short line. Data points/pixels associated with high density are preferred.

As discussed above, complexity refers to a degree to which a data point/pixel represents a similarity value calculated based on complex (or distinguishing/strong) input data (e.g., a video fingerprint that is distinct, unique and/or include complex vectors). Data points associated with low complexity tend to create clusters of high heat that do not adequately form lines representative of match lines. These data points are often responsible for false positive identifications of match lines where inferior (e.g., less precise) techniques have been employed to identify match lines in a heat map. Accordingly, data points/pixels and lines associated with high complexity are preferred over data points/pixels associated with low complexity. Similar to analysis of intensity of a point/pixel, in order to determine a complexity value/level associated with a particular data point/pixel of a short line, short line analysis/filter component 306 analyzes a heat value represented by the data point with respect to heat values represented by data points within proximate vicinity of the data point.

However, regarding complexity, short line analysis/filter component 306 can analyze characteristics of a heat value of the data point with respect to heat values associated with data points around the data point on a more granular level. In particular, short line analysis/filter component 306 analyzes patterns associated with heat values of data points/pixels surrounding a particular data point of the short line. For example, where a data point is associated with a high heat that slowly fades around the data point, short line analysis/filter component 306 can associate a high complexity value with the data point. In another example, where a data point is associated with high heat and the data points within a vicinity of the data point are associated with heat values that interchangeably rise and fall, short line analysis/filter component 306 can associate a low complexity value with the data point.

Based on determinations of intensity and density for respective data points of a short line, short line analysis/filter component 306 can determine a strength value to associate with the short line. For example, the greater collective intensity and density of the respective points of the short line, the greater the strength of the short line. In addition, in some aspects, based on determinations of complexity for respective data points of a short line, short line analysis/filter component 306 can determine a complexity value to associate with the short line. For example, the lower the collective complexity values of the respective points of the short line, the lower the complexity value for the short line.

In an aspect, short line analysis/filter component 306 can assist short line detection component 304 with respect to selecting a single short line for associating with an area of interest out of a plurality of short lines identified in the area interest (e.g., via Hough transformation or another line finding technique), based on their respective strengths (and possibly complexity). For example, out of the plurality of short lines identified for a single area of interest, short line detection component 304 can select one of the short lines to associate with the area of interest that has the highest strength and highest complexity.

In another aspect, short line analysis/filter component 306 can analyze a set of short lines respectively selected by short line detection component 304 to represent the areas of interest, and based on its analysis, determine a subset of the set of short lines for merging (e.g., discussed infra with respect to merging component 408). According to this aspect, out of the set of short lines respectively associated with each of the areas of interest (where each of the areas of interest have been associated with one or no short lines), short line analysis/filter component 306 can select a subset of the short lines associated with strength and complexity values respectively above threshold values.

In another aspect, short line analysis/filter component 306 can analyze a set of short lines respectively selected by short line detection component 304 to represent the areas of interest and associate information with the respective short lines indicating their relative strengths and complexity. This information can later be employed by short line merger component 308, continuity component 310 and/or match finder component 312.

Still in yet another aspect, based on its determinations of strength and complexity of short lines identified for respective areas of interest by short line detection component 304, short line analysis/filter component 306 can identify additional areas of interest to inspect for potential promising short lines (e.g., representative of matches between the content being compared via the heat map). In particular, where short line analysis/filter component 306 identifies a short line associated with high strength and high complexity (e.g., above a threshold strength and complexity value), this is indicative that the data points of the short line have a high probability of representing matching content between the data set being compared via the heat map. Given the nature and organization of the data described by the heat map, where a high probability of matching content is detected by a short line, it is likely that additional matching content will generate match lines in the same area (e.g., same line trajectory) as the short line.

Therefore, in response to identification of a short line having high strength and high complexity, referred to as a promising short line, short line detection component 304 can identify additional areas of interest around the promising short line and short line analysis component 304 can proceed to process these additional areas of interest in the same manner described with respect to the initially identified areas of interest. In addition, short line analysis component 304 can keep track of previously analyzed areas of interest so as to ensure a same area of interest is not processed more than once (e.g., de-duplicate areas of interest to not process the same area many times).

In aspect, an additional area of interest is identified by short line detection component 304 by moving the area of interest in which a promising line was detected slightly over from its original coordinate location and collinear with its original coordinate location. For example, the dimensions of the area of interest in which the promising line was detected can retain its dimensions (e.g., H×L) and be moved a predetermined distance along the trajectory of the promising short line (e.g., move X pixels/points to the to the right and X pixels/points up or more X pixels/points to the left and X pixels/points down).

After all areas of interest have been determined and processed (e.g., the short lines are identified, filtered and characterized with respect to strength and complexity), the remaining short lines respectively selected to represent a single area of interest are merged into longer lines. Short line merger component 308 is configured to form a long line by merging a plurality of aligned or substantially aligned short lines associated with a single region of interest together. In particular, short line merger component 308 is configured to identify respective data points/pixels forming each of the remaining short lines (e.g., associated with a single region of interest, i.e., the large rectangle in FIG. 4) and merge some or all of these data points/pixels into a single merged long line. In an aspect, short line merger component 308 can analyze the respective data points/pixel associated with each of the short lines and select a subset of these data point/pixels for merging that are associated with strength and complexity values above threshold strength and/or complexity value requirements. Although the term "line" is employed to describe a merged or long line, a merged/long line can include data points that do not align perfectly to form a straight line. The data points/pixels that form a merged/long line have a high probability of representing matching or substantially matching data included in the respects data sets being compared via the heat map. Later, a portion of the long line (or the entire long line) is analyzed and determined as a match line (or not), based at least in part on continuity of the portion.

Figure 6:
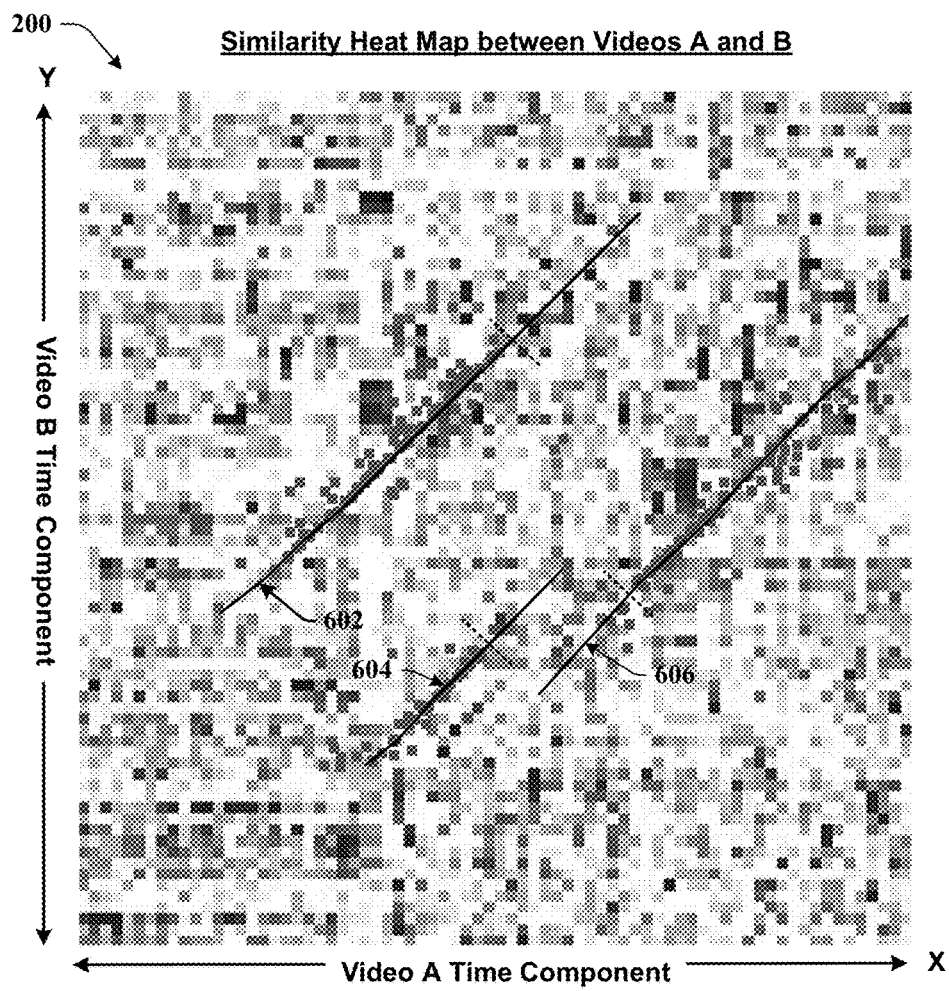
FIG. 6 illustrates an example heat map with merged short lines in accordance with various aspects and embodiments described herein.
Figure 6:
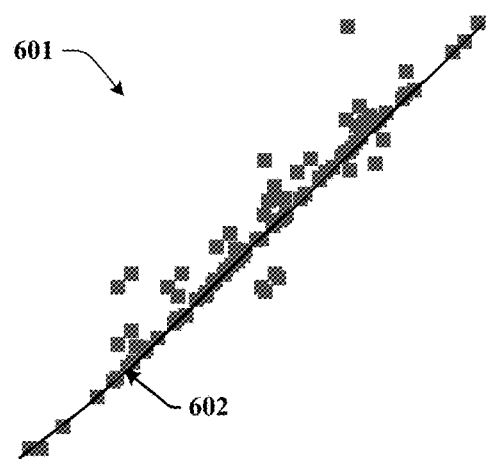

For example, FIG. 6 illustrates heat map 200 with example long lines 602, 604 and 606 formed out of merged short lines (e.g., short lines 502 and the like depicted in FIG. 5) by short line merger component 308. Diagram 601 presents an enlarged view of short line 602 extracted from heat map 200 for ease of demonstration. As seen in FIG. 6, each long line is formed at an angle (e.g., a substantially 45° angle) with respect to the axes of the heat map. Also, the long lines 602, 604 and 606 are overextended, as indicated by the dashed lines intersecting the respective long lines. For example, the portion of the long lines beyond the respective dashed lines is added by short line merger component 308 (e.g., even though short lines were note detected in these areas) to glue potential gaps in the long lines. In this step, some or all of the points of each short line becomes a part of exactly one merged line.

In an aspect, all of the short lines associated with a region of interest may not align perfectly. For example, some short lines can have trajectory paths that are parallel to one another. In another example, the angles of the short lines can vary slightly. In an aspect, short line merger component 308 is configured to connect short lines into a single long line by following the trajectory of a single one of the short lines and merging the other short lines onto this trajectory path.

For example, given a plurality of parallel short lines, short line merger component 308 can select the short line falling in the middle of the plurality of short lines and draw a phantom long line based on this short line. Short line merger component 308 can then merge the short lines falling on either sides of the phantom line onto the phantom line. Aside from selecting the short line that falls in the middle of a plurality of parallel short lines, short line merger component 308 can employ various techniques to identify one of the short lines (e.g., associated with a region of interest) to follow. For example, short line merger component 308 can choose a short line to follow based on its location with respect to other short lines, based on its angle (e.g., being closest to 45°), based on its strength and complexity with respect to other short lines, based on strengths and complexities of short lines adjacent to the short line, and/or based on mean or median position of the short lines.

In another aspect, short line merger component 308 can employ a Hough transform to facilitate determining how to merge miss-aligned short lines into a single long line. In yet another aspect, short line merger component 308 can merge short lines in different manners into a plurality of potential long line candidates and select one of the long line candidates as the long line.

It should be appreciated that holes can exist between short lines prior to merging. For example, where areas of interest did not return a short line, there will be a gap between two short lines. Accordingly, short line merger component 308 can fill such a gap when forming a long line by connecting the endpoints of the two short line segments on either sides of the gap.

Referring back to FIG. 3, continuity component 310 is configured to determine continuity along portions of a merged or long line. As used herein, the term continuity refers to an estimation of the probability that a given point associated with a long or merged line lies on a continuous line. The greater the heat value associated with the point and the points around it, the higher the probability the point lies on a continuous line. Accordingly, continuity can represent a degree to which heat values associated with adjacent data points/pixels along a long line vary with respect to a threshold heat value. The portions of a long line with adjacent data points/pixels having heat values above a threshold heat values are considered to have a high degree of continuity. A portion of a long line that has a degree of continuity above a continuity threshold, and/or has degree of continuity above a threshold continuity for a length above a threshold length, is determined as a match line.

In an aspect, continuity component 310 is configured to compute a continuity value of each point/pixel along a long line based on its heat value with respect to a threshold heat value. Portions of the long line associated with adjacent pixels/points having continuity values above a threshold continuity value (e.g., or heat values above the threshold heat value) are considered continuous. If the continuity value (or heat value) of a point along the long line falls below the threshold continuity value), the long line is considered discontinuous at that point. The less variance in heat values, the higher the degree of continuity.

In particular, continuity component 310 can compute a continuity curve for a long line based on heat values associated with pixels/points that fall on the long line. The curve increases (or rises) as heat values rise and decreases (or falls) as heat values lower. In an aspect, portions of the long line where the curve values are higher than a threshold value (e.g., 0.0) are considered to be continuous and/or associated with a high degree of continuity. Where the continuity value (or heat value) of a point/pixel along the long line falls below the threshold continuity value (e.g., is less than or equal to 0;0), the long line is considered discontinuous at that point/pixel. However, rather than declaring the long line discontinuous at that point, continuity component 310 can overlook the point associated with the low continuity value (or heat value) based on a degree of continuity of the long line on either sides of the point. In particular, for line parts where enough of the surrounding line is continuous, continuity component can determine a boost value. The boost value can be based on various factors. In an aspect, the boost value is determined based on a degree of continuity of the long line surrounding the point. In another aspect, the boost value is determined based on average line heat surrounding the discontinuous point. Continuity component 310 can then increase the continuity values of all the points along the long line based on the boost value and re-compute the continuity curve using the modified continuity parameters.

Match finder component 312 is configured identify one or more portions of a long line that are substantially continuous based on continuity values associated with respective points/pixels along the long line. In particular, calculations of continuity at each point of a long line indicate how continuous the long line is at a particular place or over a particular portion. Portions of a long line associated with high degrees of continuity are determined to have a high probability of representing matching data between the data sets being compared via the heat map.

In an aspect, for a portion of a long line associated with continuity values above a threshold value over a long duration/length (e.g., a duration above a threshold duration/length), match finder component 312 can compute a continuity score for the portion. The continuity score is based on a sum of the respective continuity values for each point/pixel included in the portion. Where a portion of a long line has a continuity score above a threshold value, the portion is considered a match line. In other words, the data points/pixels along the line portion are considered representative of matching content between the compared data sets. In an aspect, end points of a match line are determined based on association of the end points with heat values above a threshold heat value. Match finder component 312 can identify and extract the data represented by the points/pixels of a match line and declare this data as matching data. For example, match finder component 312 can identify the respective parts of videos A and B corresponding to the data points/pixels forming a match line to identify content included in videos A and B that is the same or substantially similar.

Figure 7:
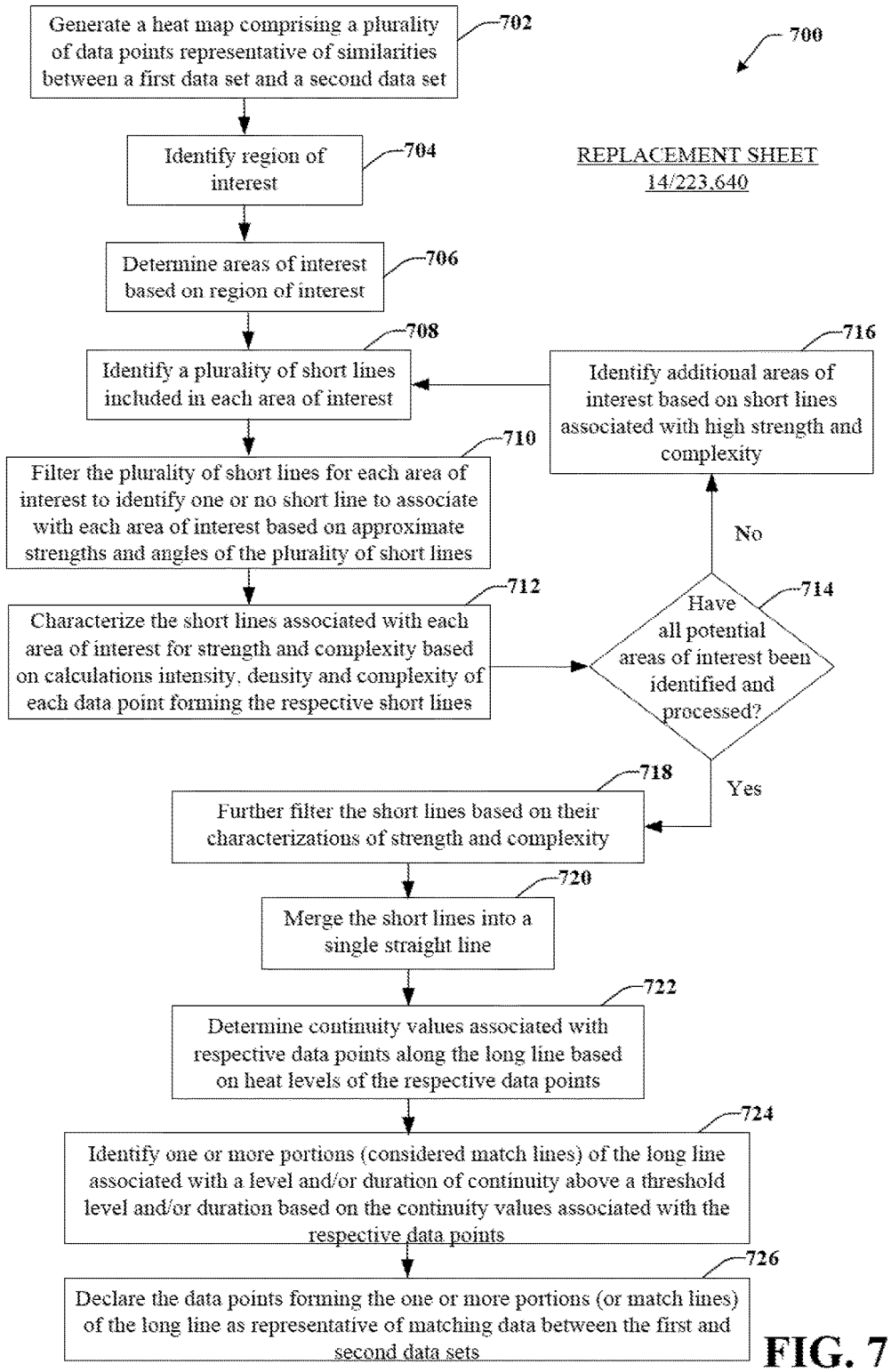
FIG. 7 presents a flow chart of an example process for identifying lines in a heat map representative of overlap between two data sets in accordance with various aspects and embodiments described herein.
Figure 8:
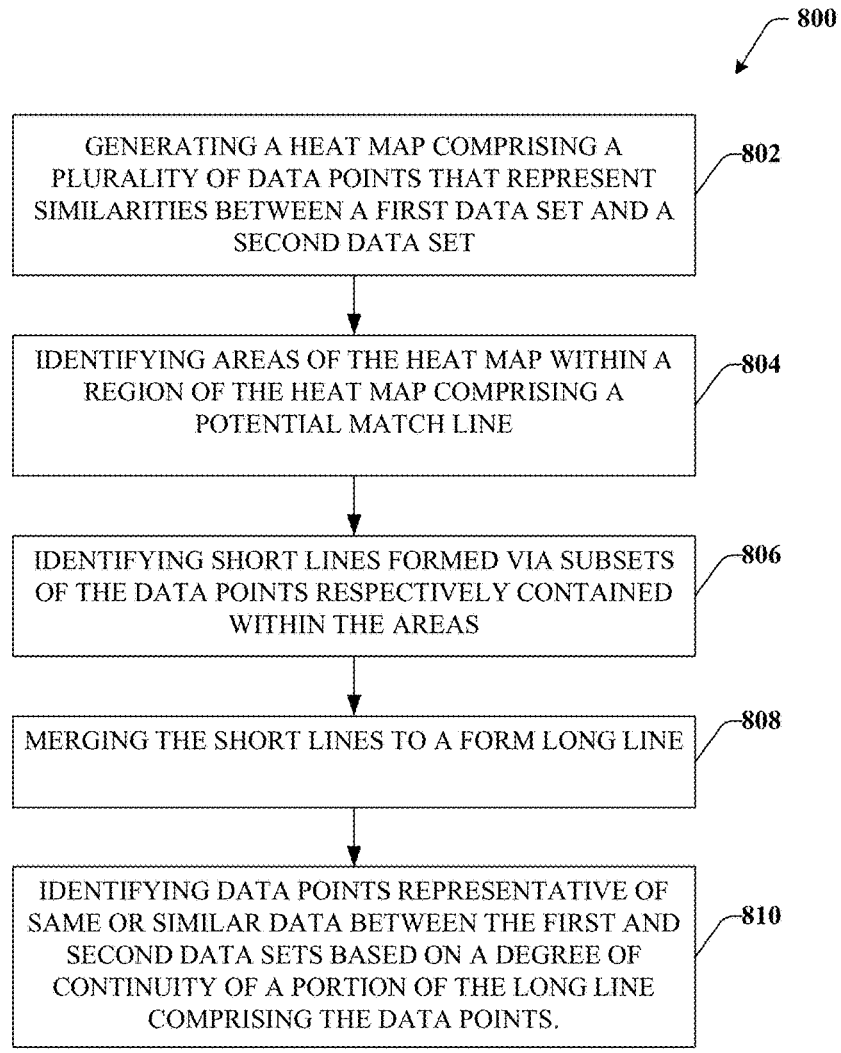
FIG. 8 is a flow diagram of an example method for identifying lines in a heat map representative of overlap between two data sets in accordance with various aspects and embodiments described herein.
Figure 9:
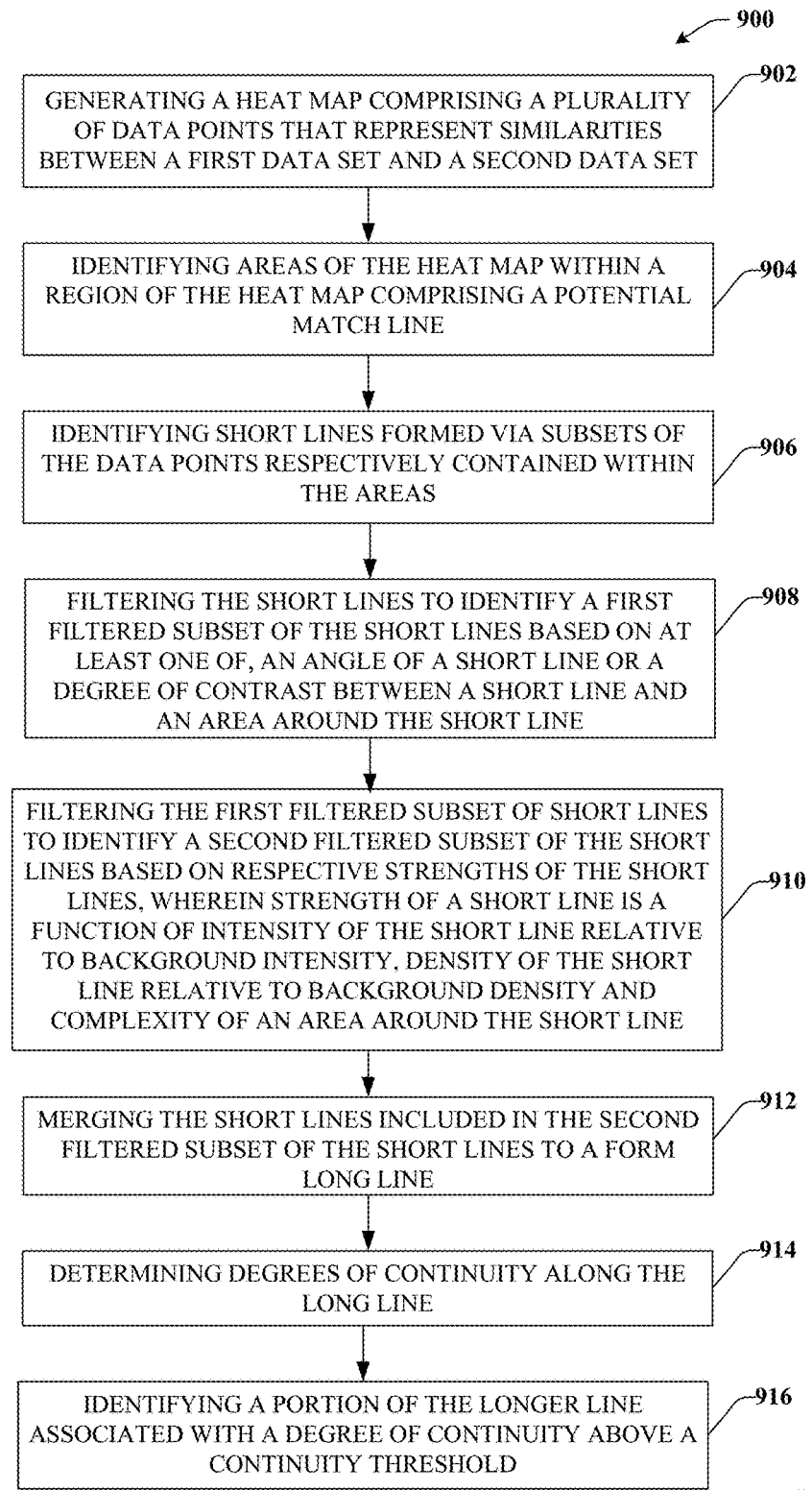
FIG. 9 is a flow diagram of another example method for identifying lines in a heat map representative of overlap between two data sets in accordance with various aspects and embodiments described herein.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example process 700 for identifying match lines in a heat map, in accordance with various aspects and embodiments described herein. At 702, a heat map (e.g., heat map 200) is generated that includes plurality of data points representative of similarities between a first data set and a second data set. At 704, a region of interest in the heat map is identified. For example, the region of interest can include a rectangle formed at an angle with respect to the axes of the heat map and encompass a potential match line candidate. At 706, areas of interest are determined within the region of interest based on the dimensions and position of the region of interest. For example, the areas of interest can include a plurality of partially overlapping rectangles of smaller length and same width as the region of interest. At 708, pluralities of short lines included in each area of interest are identified. For example, using a line finding technique (e.g., a Hough transform), short lines that are formed via the data points included in each area of interest are generated.

At 710, for each of the areas of interest, the pluralities of short lines are filtered based on approximate strengths of the short lines and angles of the short lines. For example, short lines that are too steep or too planar are discarded. At this step, a single short line is selected for each area of interest out of the plurality of short lines for each area of interest. In an aspect, some of the areas of interest may not include any promising short lines in response to the filtering. Accordingly, no short line will be selected for these areas of interest.

At 712, for each of the short lines associated with areas of interest, the short lines are analyzed and characterized for strength and complexity based on calculations of intensity, density and complexity for each data point forming the respective short lines. At 714, if all potential areas of interest have not been identified, process 700 continues to step 716 where additional areas of interest are identified based on short lines associated high strength and complexity. For example, where a short line is characterized as having relatively high strength and complexity (e.g., above threshold strength and complexity values), this is an indication that the area around the short line may likely include short lines associated with high strength and complexity. Thus additional areas of interest can be added at step 716 near (and/or overlapping) an area of interest including a short line characterized as has having relatively high strength and complexity and process 700 can continue with processing these additional areas via steps 708-712.

At 714, once additional areas of interest have been added and processed and no new short lines exhibiting high strength and complexity are identified, it is determined that all potential areas of interest have been processed and identified and process 700 continues to step 718. At 718, the short lines identified via step 710 can be further filtered based on their respective characterizations of strength and complexity. For example, those short lines that do not have a strength and complexity above a threshold strength and complexity can be discarded. (In an aspect, step 718 can be skipped). At 720, the remaining short lines are merged into a single long line. In particular, data points forming the remaining short lines are merged into a single long line. In an aspect, a subset of the data points forming the remaining short lines are selected for merging into a long line based on strength and complexity values respectively associated with the subset of data points being above threshold value (e.g., only portions of the short lines are merged). At 722, continuity values associated with respective data points along the long line are determined based on heat levels of the respective data points.

At 724, one or more portions of the long line associated with a level and/or duration of continuity above a threshold level and/or duration are identified based on the continuity values associated with the respective data points. These one more portions of the long line are classified as match lines. At 726, the data points forming the match lines are declared (with a high confidence level) as representative of matching data between the first and second data sets. The matching data respectively associated with these data points from the first and second data sets can then be identified.

FIG. 8 illustrates a flow chart of an example method 800 for identifying match lines in a heat map, in accordance with various aspects and embodiments described herein. At 802, a heat map is generated that includes a plurality of data points that represent similarities between a first data set and a second data set (e.g., via heat map generation component 106). At 804, areas of the heat map within a region of the heat map comprising a potential match line are identified (e.g., via interest area component 302). At 806, short lines formed via subsets of the data points respectively contained within the areas are identified (e.g., via short line detection component 304). At 808, the short lines are merged to a form long line (e.g., via short line merger component 308). At 810, data points representative of same or similar data between the first and second data sets are identified based on a degree of continuity of a portion of the long line comprising the data points (e.g., via match finder component 312).

FIG. 9 illustrates a flow chart of another example method 900 for identifying match lines in a heat map, in accordance with various aspects and embodiments described herein. At 902, a heat map is generated that includes a plurality of data points that represent similarities between a first data set and a second data set (e.g., via heat map generation component 106). At 904, areas of the heat map within a region of the heat map comprising a potential match line are identified (e.g., via interest area component 302). At 906, short lines formed via subsets of the data points respectively contained within the areas are identified (e.g., via short line detection component 304). At 908, the short lines are filtered to identify a first filtered subset of the short lines based on at least one of, an angle of a short line or a degree of contrast between a short line and an area around the short line (e.g., via short line analysis/filter component 306). In particular, at this step, one or no short lines are selected to represent each of the areas of interest. Thus the first filtered subset of the short lines includes the individual short lines selected to represent the represent the respective areas of interest.

At 910 the first filtered subset of short lines is further filtered to identify a second filtered subset of the short lines based on respective strengths of the short lines, wherein strength of a short line is a function of intensity of the short line relative to background intensity, density of the short line relative to background density and complexity of an area around the short line (e.g., via short line analysis/filter component 306). At 912, the short lines included in the second filtered subset are merged to a form long line (e.g., via short line merger component 308). At 914 degrees of continuity along the long line are determined (e.g., via continuity component 310). At 916, a portion of the long line associated with a degree of continuity above a continuity threshold is identified (e.g., via match finder component 312).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
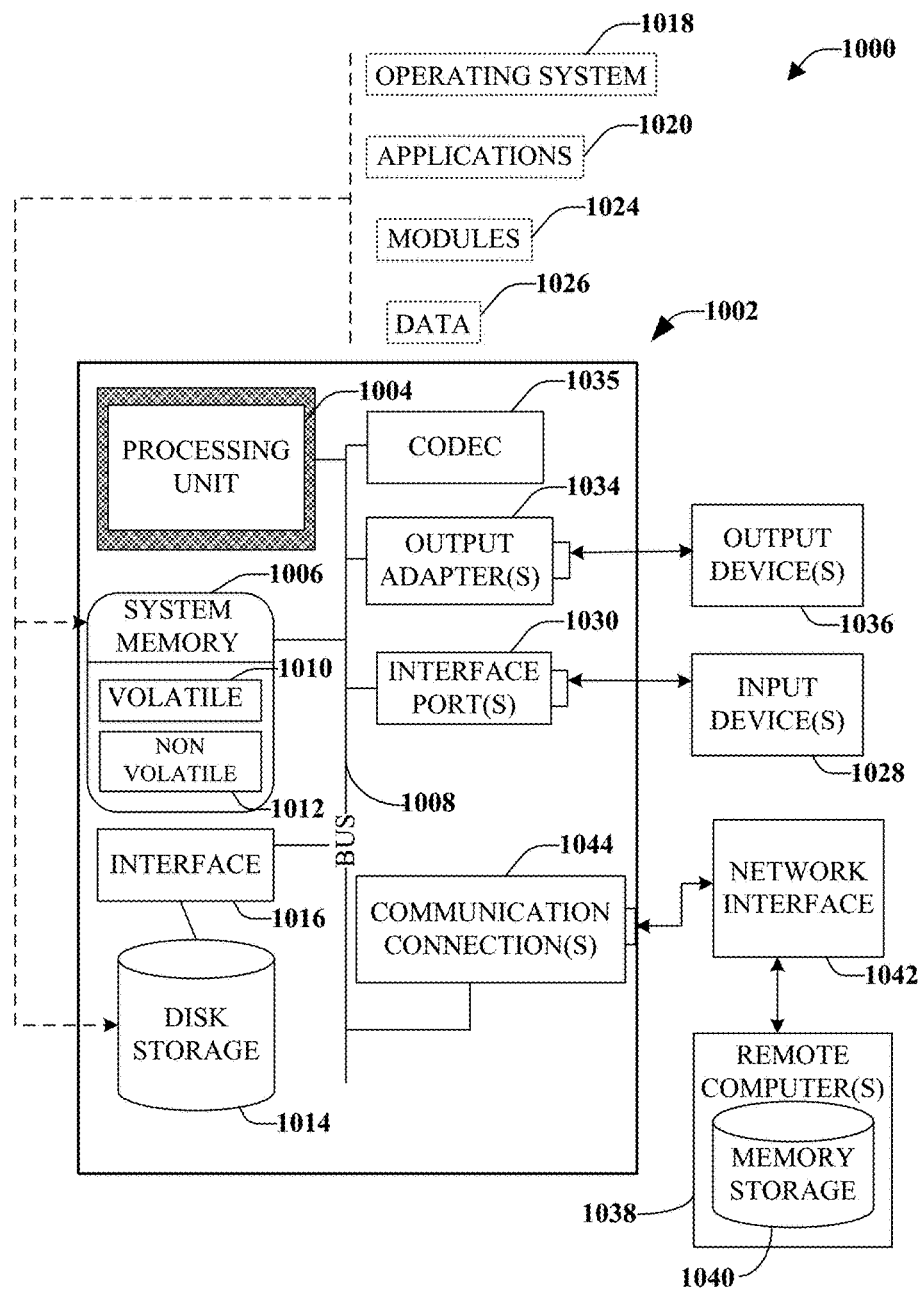
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
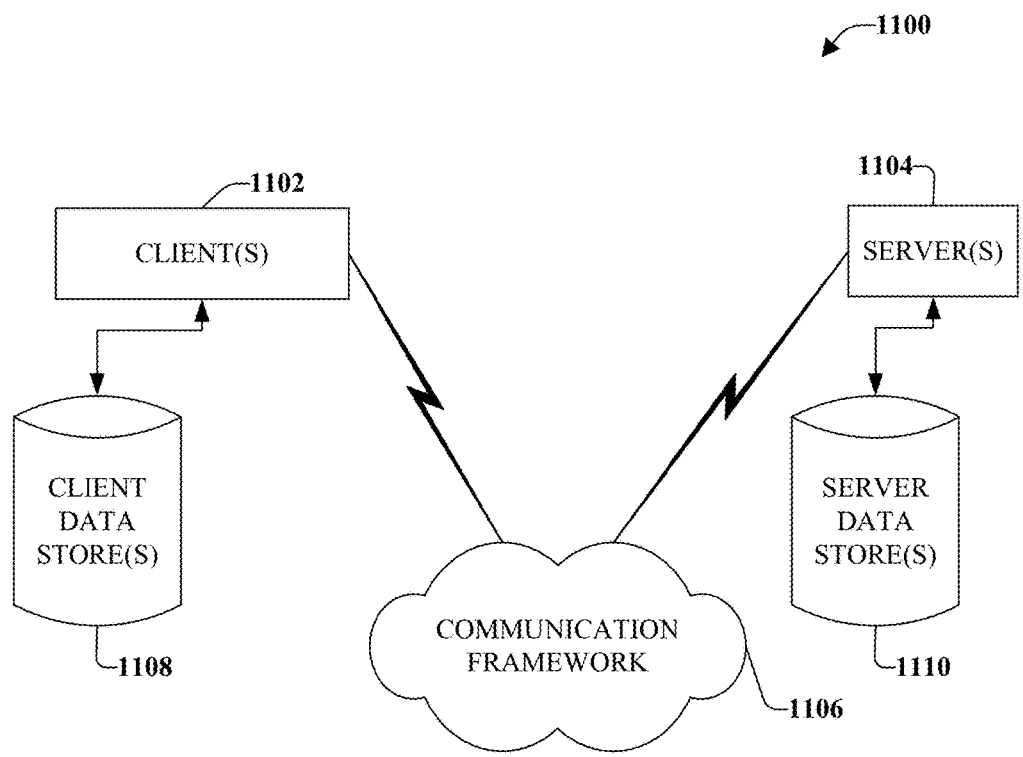
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present heat map analysis techniques. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method, comprising:
   employing a processor to execute computer executable instructions stored on a non-transitory computer readable medium to perform the following acts:
   generating a heat map representative of similarities between two media items, the heat map comprising a plurality of data points corresponding to difference values between fingerprints associated with points in time in a first media item with respect to fingerprints associated with points in time in a second media item;
   identifying areas of the heat map within a region of the heat map comprising a potential match line;
   identifying short lines formed via subsets of the data points respectively contained within the areas;
   merging the short lines to form a long line;
   determining degrees of continuity along the long line;
   identifying a portion of the long line associated with a degree of continuity above a continuity threshold; and
   identifying data points included in the portion of the long line associated with the degree of continuity above the continuity threshold as representative of a match between portions of the first and second media items.

2. The method of claim 1, wherein the identifying the short lines comprises performing a Hough transform for each of the subsets of the data points.

3. The method of claim 1, further comprising:
   filtering the short lines to identify a filtered subset of the short lines based on at least one of, an angle of a short line or a degree of contrast between a short line and an area around the short line, wherein the merging the short lines to form the long line comprises merging the filtered subset of the short lines.

4. The method of claim 1, further comprising:
analyzing respective data points included in the subsets of the data points constituting respective short lines based on at least one of: intensity of a data point relative to background intensity, density of a data point relative to background density, or complexity of an area around a data point; and
filtering the short lines to identify a filtered subset of the short lines based on the analyzing, wherein the merging the short lines to form the long line comprises merging the filtered subset of the short lines.

5. The method of claim 1, further comprising:
filtering the short lines to identify a filtered subset of the short lines based on respective strengths of the short lines, wherein strength of a short line is a function of intensity of the short line relative to background intensity, density of the short line relative to background density and complexity of an area around the short line, wherein the merging the short lines to form the long line comprises merging the filtered subset of the short lines.

6. The method of claim 1, wherein the merging the short lines to form the long line comprises merging to the short lines to close gaps between the short lines.

7. The method of claim 1, wherein the determining the degrees of continuity along the long line comprises:
generating continuity curves for the long line based on heat associated with respective data points of the long line, wherein the continuity curves increases as a function of high heat and decreases as a function of low heat.

8. The method of claim 7, wherein the identifying the portion of the long line associated with the degree of continuity above the continuity threshold comprises identifying an area of the continuity curve associated with values above a threshold value for a consistent duration above a threshold duration.

9. The method of claim 1, wherein the difference values comprise Hamming or Jaccard distances between respective fingerprints.

10. A system, comprising:
a memory that stores computer executable components;
a processor that executes at least the following computer executable components stored in the memory:
a heat map component configured to generate a heat map representative of similarities between two media items, the heat map comprising a plurality of data points corresponding to difference values between fingerprints associated with points in time in a first media item with respect to fingerprints associated with points in time in a second media item; and
an analysis component configured to identify areas of the heat map within a region of the heat map comprising a potential match line, identify short lines respectively formed via data points within the areas, merge the short lines to form a long line, determine degrees of continuity along the long line, identify a portion of the long line associated with a degree of continuity above a continuity threshold, and identify data points included in the portion of the long line associated with the degree of continuity above the continuity threshold as representative of a match between portions of the first and second media items.

11. The system of claim 10, wherein the analysis component identifies the short lines using respective Hough transforms for the data points within the areas.

12. The system of claim 10, wherein the analysis component further filters the short lines to identify a filtered subset of the short lines based on at least one of, an angle of a short line or a degree of contrast between a short line and an area around the short line, and wherein the analysis component merges the filtered subset of the short lines to form the long line.

13. The system of claim 10, wherein the analysis component further filters the short lines to a filtered subset of short lines based on analysis of respective data points forming the short lines, wherein the analysis is based on at least one of: intensity of a data point relative to background intensity, density of a data point relative to background density, or complexity of an area around a data point, and filters short lines to identify a filtered subset of the short lines based on the analyzing, and wherein the analysis component merges the filtered subset of the short lines to form the long line.

14. The system of claim 10, wherein the analysis component further filters the short lines to a filtered subset of short lines based on respective strengths of the short lines, wherein strength of a short line is a function of intensity of the short line relative to background intensity, density of the short line relative to background density and complexity of an area around the short line, and wherein the analysis component merges the filtered subset of the short lines to form the long line.

15. The system of claim 10, wherein the analysis component determines the degree of continuity along the long line by generating a continuity curve for along the long line as a function of heat associated with respective areas of the long line, wherein the continuity curves increases as a function of high heat and decreases as a function of low heat.

16. The system of claim 15, wherein analysis component identifies the portion of the long line associated with the degree of continuity above the continuity threshold based on areas of the continuity curves having values higher than the threshold value, and wherein the analysis component associates a high confidence level with the portion of the long line as comprising the subset of the data points representative of matches between data included in the first and second data sets.

17. A non-transitory computer-readable storage medium comprising computer-readable instructions that, in response to execution, cause a computing system having a processor to perform operations, comprising:
generating a heat map representative of similarities between two media items, the heat map comprising a plurality of data points corresponding to difference values between fingerprints associated with points in time in a first media item with respect to fingerprints associated with points in time in a second media item;
identifying areas of the heat map within a region of the heat map comprising a potential match line;
identifying short lines formed via subsets of the data points respectively contained within the areas;
merging the short lines to a form long line;
determining degrees of continuity along the long line;
identifying a portion of the long line associated with a degree of continuity above a continuity threshold; and
identifying data points included in the portion of the long line associated with the degree of continuity above the continuity threshold as representative of a match between portions of the first and second media items.

* * * * *